(12) United States Patent
Liburdi

(10) Patent No.: US 11,800,229 B2
(45) Date of Patent: Oct. 24, 2023

(54) CAMERA CALIBRATION UTILIZING ELECTROACTIVE POLYMER

(71) Applicant: Aptiv Technologies Limited, St. Michael (BB)

(72) Inventor: Steven A. Liburdi, Grosse Pointe Farms, MI (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/647,290

(22) Filed: Jan. 6, 2022

(65) Prior Publication Data

US 2022/0132039 A1   Apr. 28, 2022

Related U.S. Application Data

(63) Continuation of application No. 16/386,959, filed on Apr. 17, 2019, now abandoned.

(51) Int. Cl.
| | | |
|---|---|---|
| *H04N 23/69* | (2023.01) | |
| *G06T 7/80* | (2017.01) | |
| *G06T 7/00* | (2017.01) | |
| *B60R 11/04* | (2006.01) | |
| *H04N 17/00* | (2006.01) | |

(52) U.S. Cl.
CPC ............. *H04N 23/69* (2023.01); *B60R 11/04* (2013.01); *G06T 7/80* (2017.01); *G06T 7/97* (2017.01); *H04N 17/002* (2013.01); *B60R 2300/402* (2013.01)

(58) Field of Classification Search
None
See application file for complete search history.

(56) References Cited

U.S. PATENT DOCUMENTS

| | | | |
|---|---|---|---|
| 7,893,965 B2 * | 2/2011 | Heim | G03B 5/00 348/208.99 |
| 9,891,612 B2 | 2/2018 | Charpentier | |
| 2007/0041721 A1 * | 2/2007 | Ito | G03B 5/08 348/E5.046 |
| 2009/0040361 A1 | 2/2009 | Heim et al. | |
| 2010/0084726 A1 * | 4/2010 | Lee | H01L 27/14625 257/E31.127 |
| 2011/0221950 A1 | 9/2011 | Oostra et al. | |

(Continued)

FOREIGN PATENT DOCUMENTS

| | | |
|---|---|---|
| CN | 102422627 | 4/2012 |
| CN | 104580859 | 4/2015 |

(Continued)

OTHER PUBLICATIONS

"Foreign Office Action", EP Application No. 20167126.0, May 6, 2022, 5 pages.

(Continued)

*Primary Examiner* — Chikaodili E Anyikire
(74) *Attorney, Agent, or Firm* — Sawtooth Patent Group PLLC

(57) ABSTRACT

An illustrative example camera device includes a substrate and a sensor supported on the substrate. The sensor is configured to gather image information. A lens is situated near the sensor and an electroactive polymer selectively causes relative movement between the sensor and the lens.

20 Claims, 4 Drawing Sheets

(56) References Cited

U.S. PATENT DOCUMENTS

| | | | | |
|---|---|---|---|---|
| 2012/0075519 | A1* | 3/2012 | Blasch | G03B 3/10 348/340 |
| 2014/0168799 | A1* | 6/2014 | Hubert | H10N 30/857 310/366 |
| 2015/0022664 | A1* | 1/2015 | Pflug | G06F 3/04883 348/148 |
| 2015/0177477 | A1 | 6/2015 | Hubert | |
| 2016/0327930 | A1 | 11/2016 | Charpentier et al. | |
| 2017/0277187 | A1* | 9/2017 | Refai | G05D 1/0094 |
| 2020/0336667 | A1 | 10/2020 | Liburdi | |
| 2022/0017016 | A1* | 1/2022 | Slama | B60R 11/0235 |

FOREIGN PATENT DOCUMENTS

| | | |
|---|---|---|
| CN | 105842960 | 8/2016 |
| CN | 106713897 | 5/2017 |
| WO | 2007015904 | 2/2007 |
| WO | 2007051904 | 5/2007 |

OTHER PUBLICATIONS

"Extended European Search Report", European Application No. 20167126.0, dated Aug. 12, 2020, 7 pages.

"Final Office Action", U.S. Appl. No. 16/386,959, dated Feb. 24, 2021, 9 pages.

"Final Office Action", U.S. Appl. No. 16/386,959, dated Nov. 1, 2021, 14 pages.

"Foreign Office Action", CN Application No. 202010298849.7, dated May 28, 2021, 18 pages.

"Non-Final Office Action", U.S. Appl. No. 16/386,959, dated Apr. 7, 2020, 7 pages.

"Non-Final Office Action", U.S. Appl. No. 16/386,959, dated Jul. 6, 2021, 9 pages.

"Non-Final Office Action", U.S. Appl. No. 16/386,959, dated Nov. 2, 2020, 9 pages.

"Notice of Allowance", U.S. Appl. No. 16/386,959, dated Aug. 27, 2020, 8 Pages.

\* cited by examiner

CAMERA CALIBRATION UTILIZING ELECTROACTIVE POLYMER

CROSS-REFERENCE TO RELATED APPLICATION

This application is a continuation of and claims priority to U.S. application Ser. No. 16/386,959, filed Apr. 17, 2019, the disclosure of which is incorporated in its entirety by reference herein.

BACKGROUND

A variety of sensor types have proven useful for providing enhanced features and control on automotive vehicles. Cameras are useful for detecting objects nearby or in a pathway of a vehicle and providing visual information to a driver. The types of cameras included on vehicles typically require that the lens and sensor be aligned with extreme precision. Known techniques to achieve such alignment rely on expensive equipment and introduce complexity and delays into the manufacturing process. For example, a five-axis machine controls the relative positions of the lens and sensor during active focus calibration. Once the desired alignment is achieved, at least one cure cycle secures the components in place.

Known camera assembly techniques have another drawback in addition to the added expense associated with the specialized equipment and time delays mentioned above. Once the camera sensor and lens are cured in position, future adjustment or calibration is not possible. Given the wide range of environmental conditions vehicles and their components are exposed to over time, camera devices are subject to material creep, printed circuit board warping, stresses from mechanical shock and vibration, and deterioration of the adhesive that secures the lens and sensor in the calibrated position. It is not possible to adjust or recalibrate the camera over time, which introduces additional expenses if a camera is replaced. If not replaced, the camera simply remains in a less-than-ideal calibration state.

SUMMARY

An illustrative example camera device includes a substrate and a sensor supported on the substrate. The sensor is configured to gather image information. A lens is situated near the sensor and an electroactive polymer selectively causes relative movement between the sensor and the lens.

An example embodiment having one or more features of the camera device of the previous paragraph includes a controller that is configured to control electrical energy applied to the electroactive polymer in an amount that causes the relative movement between the sensor and the lens.

In an example embodiment having one or more features of the camera device of any of the previous paragraphs, the controller is configured to determine when the camera device is in a calibrated state, determine at least one characteristic of the electrical energy applied to the electroactive polymer when the camera device is in the calibrated state, and maintain the at least one characteristic of the electrical energy to maintain the calibrated state of the camera device.

In an example embodiment having one or more features of the camera device of any of the previous paragraphs, the controller is configured to selectively adjust a position of at least one of the sensor or lens relative to the other of the lens or sensor to recalibrate the camera device.

In an example embodiment having one or more features of the camera device of any of the previous paragraphs, the electroactive polymer is situated against the substrate and the substrate includes at least one conductive trace for providing electrical energy to the electroactive polymer.

An example embodiment having one or more features of the camera device of any of the previous paragraphs includes a housing supporting the lens and the substrate. The electroactive polymer is situated between the substrate and a reaction surface of the housing, a space occupied by the electroactive polymer changes responsive to electrical energy, the electroactive polymer reacts against the reaction surface as the space occupied by electroactive polymer changes, and a position of the substrate relative to the housing changes as the electroactive polymer reacts against the reaction surface.

An example embodiment having one or more features of the camera device of any of the previous paragraphs at least one resilient member associated with the substrate for allowing relative movement between the substrate and the reaction surface as the electroactive polymer reacts against the reaction surface.

In an example embodiment having one or more features of the camera device of any of the previous paragraphs, the at least one resilient member biases the substrate toward the reaction surface.

In an example embodiment having one or more features of the camera device of any of the previous paragraphs, the electroactive polymer comprises a plurality of portions supported on the substrate and the at least one resilient member comprises a plurality of members respectively associated with the portions of the electroactive polymer.

In an example embodiment having one or more features of the camera device of any of the previous paragraphs, the housing includes a substrate support, at least one fastener is received through an opening in the substrate support, the at least one fastener is secured to the housing, and the at least one resilient member is associated with the at least one fastener and situated to allow relative movement between the substrate support and the reaction surface.

In an example embodiment having one or more features of the camera device of any of the previous paragraphs, the lens is supported in a fixed position relative to the housing.

In an example embodiment having one or more features of the camera device of any of the previous paragraphs, the relative movement includes at least one of a change in a distance between the sensor and the lens and a change in an angle of tilt between the sensor and the lens.

In an example embodiment having one or more features of the camera device of any of the previous paragraphs, the electroactive polymer comprises a plurality of portions supported on the substrate in respective locations, each of the portions responds to an amount of electrical energy applied to it, and different amounts of electrical energy applied to the portions, respectively, causes different relative movements between the sensor and the lens.

An illustrative example method of calibrating a camera device includes providing electrical energy to an electroactive polymer to cause relative movement between a sensor and a lens of the camera device to achieve a first relative orientation between the sensor and the lens, obtaining a first camera image of a reference when the sensor and the lens are in the first relative orientation, determining whether a correspondence between the first camera image and the reference indicates that the camera device is calibrated.

In an example embodiment having one or more features of the method of the previous paragraph, the correspondence between the first camera image and the reference indicates that the camera device is not calibrated and the method includes providing a different amount of electrical energy to the electroactive polymer to cause relative movement between the sensor and the lens to achieve a second, different relative orientation between the sensor and the lens, obtaining a second camera image of a reference when the sensor and the lens are in the second relative orientation, and determining whether a correspondence between the second camera image and the reference indicates that the camera device is calibrated.

In an example embodiment having one or more features of the method of any of the previous paragraphs, the electroactive polymer comprises a plurality of portions and providing the electrical energy comprises providing electrical energy having a first characteristic to a first one of the portions and providing electrical energy having a second, different characteristic to a second one of the portions.

In an example embodiment having one or more features of the method of any of the previous paragraphs, the relative movement between the sensor and the lens changes at least one of a distance between the sensor and the lens and an angle of the sensor relative to the lens.

In an example embodiment having one or more features of the method of any of the previous paragraphs, the camera device is supported on a vehicle and the method comprises performing the providing, obtaining and determining a plurality of times during a service life of the camera device.

An illustrative example camera device includes a substrate, sensor means supported on the substrate for gathering image information, a lens near the sensor, an electroactive polymer that selectively causes relative movement between the sensor and the lens, and control means for controlling electrical energy applied to the electroactive polymer in an amount that causes the relative movement between the sensor and the lens.

In an example embodiment having one or more features of the camera device of the previous paragraph, the control means is configured to selectively adjust a position of at least one of the sensor or lens relative to the other of the lens or sensor for recalibrating the camera device.

The various features and advantages of at least one disclosed example embodiment will become apparent to those skilled in the art from the following detailed description. The drawings that accompany the detailed description can be briefly described as follows.

DETAILED DESCRIPTION

Figure 1:
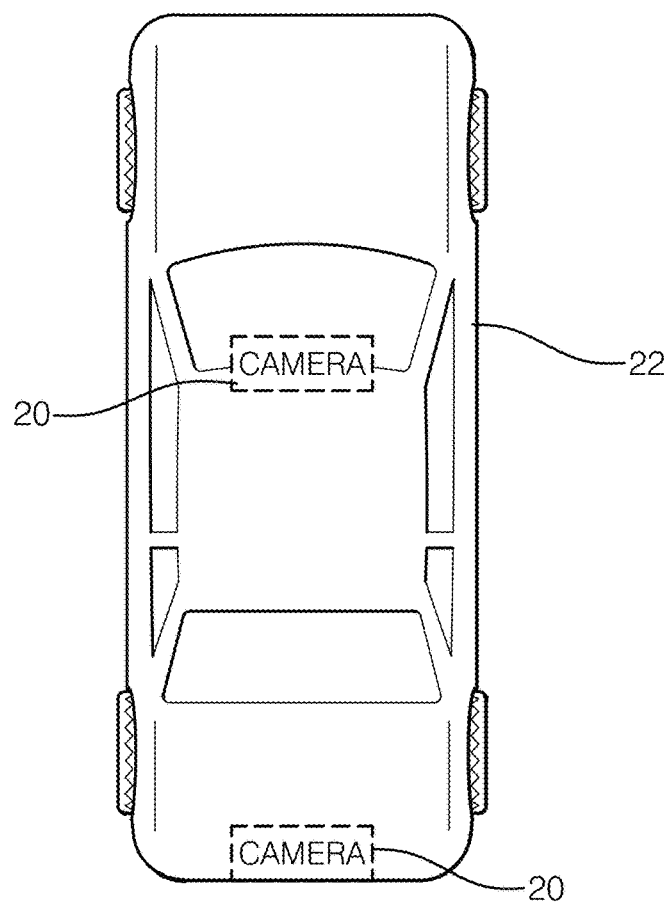
FIG. 1 diagrammatically illustrates an example vehicle including at least one camera designed according to an embodiment of this invention.

FIG. 1 schematically illustrates camera devices 20 supported on a vehicle 22. The camera devices 20 may be used for a variety of detection or image gathering purposes, such as detecting objects or conditions in a vicinity of the vehicle.

Figure 2:
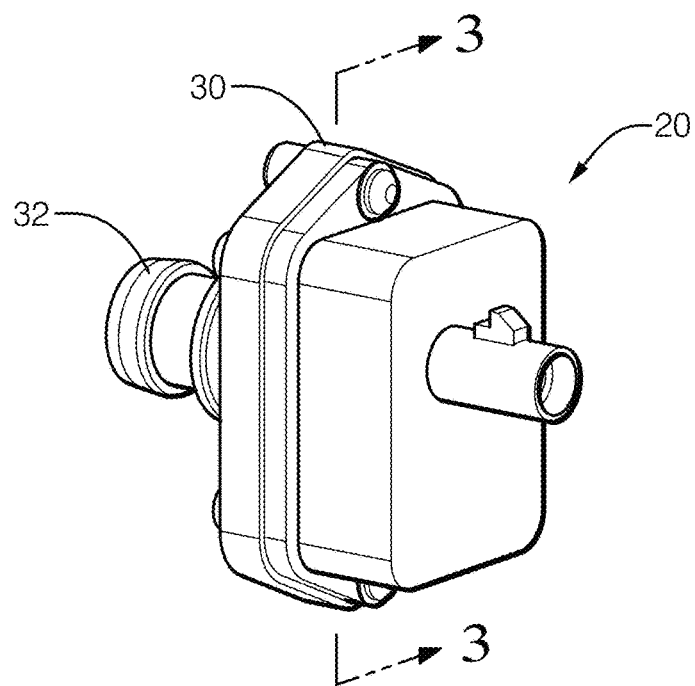
FIG. 2 diagrammatically illustrates selected an example camera device.
Figure 3:
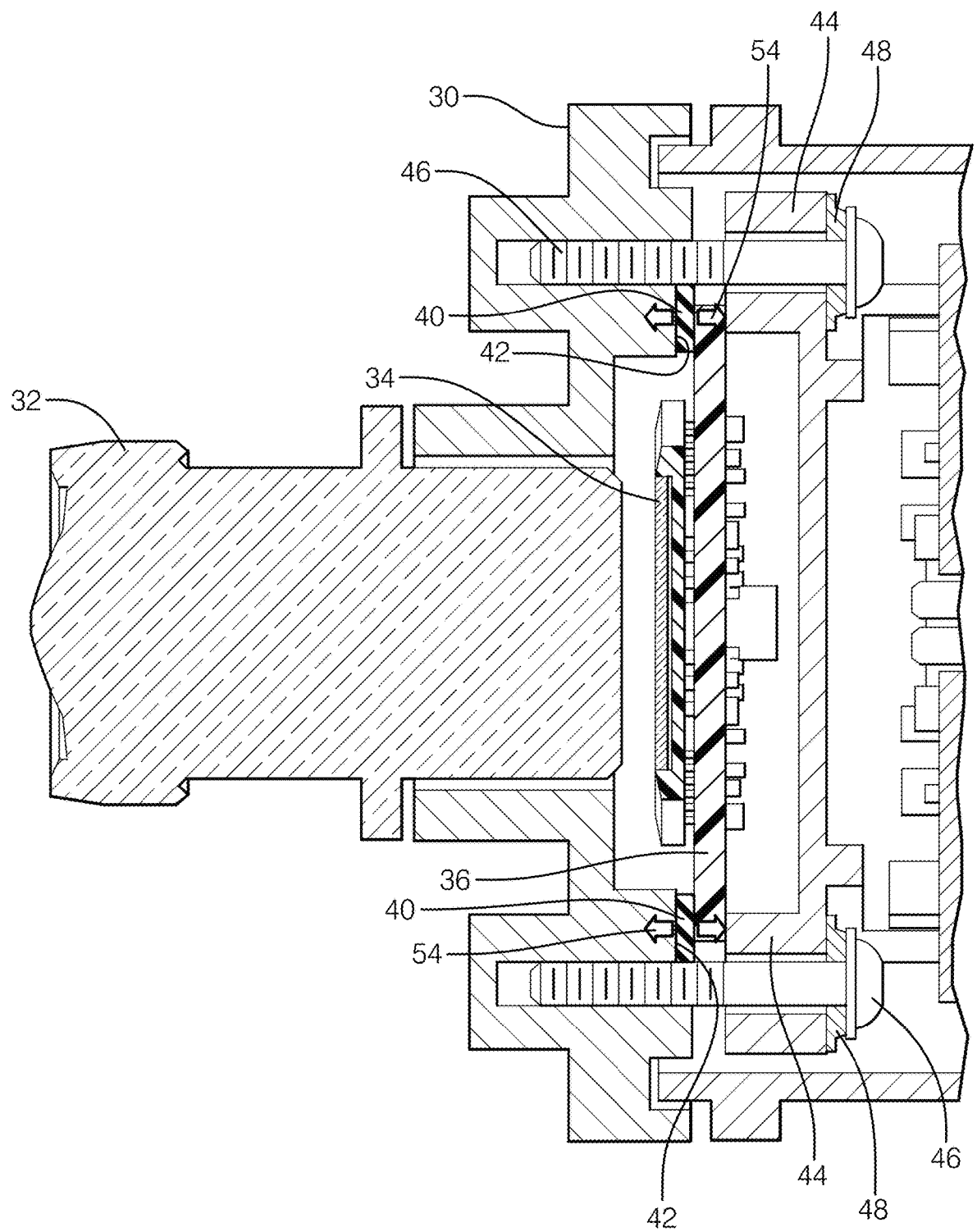
FIG. 3 is a cross-sectional illustration taken along the lines 3-3 in FIG. 2.
Figure 4:
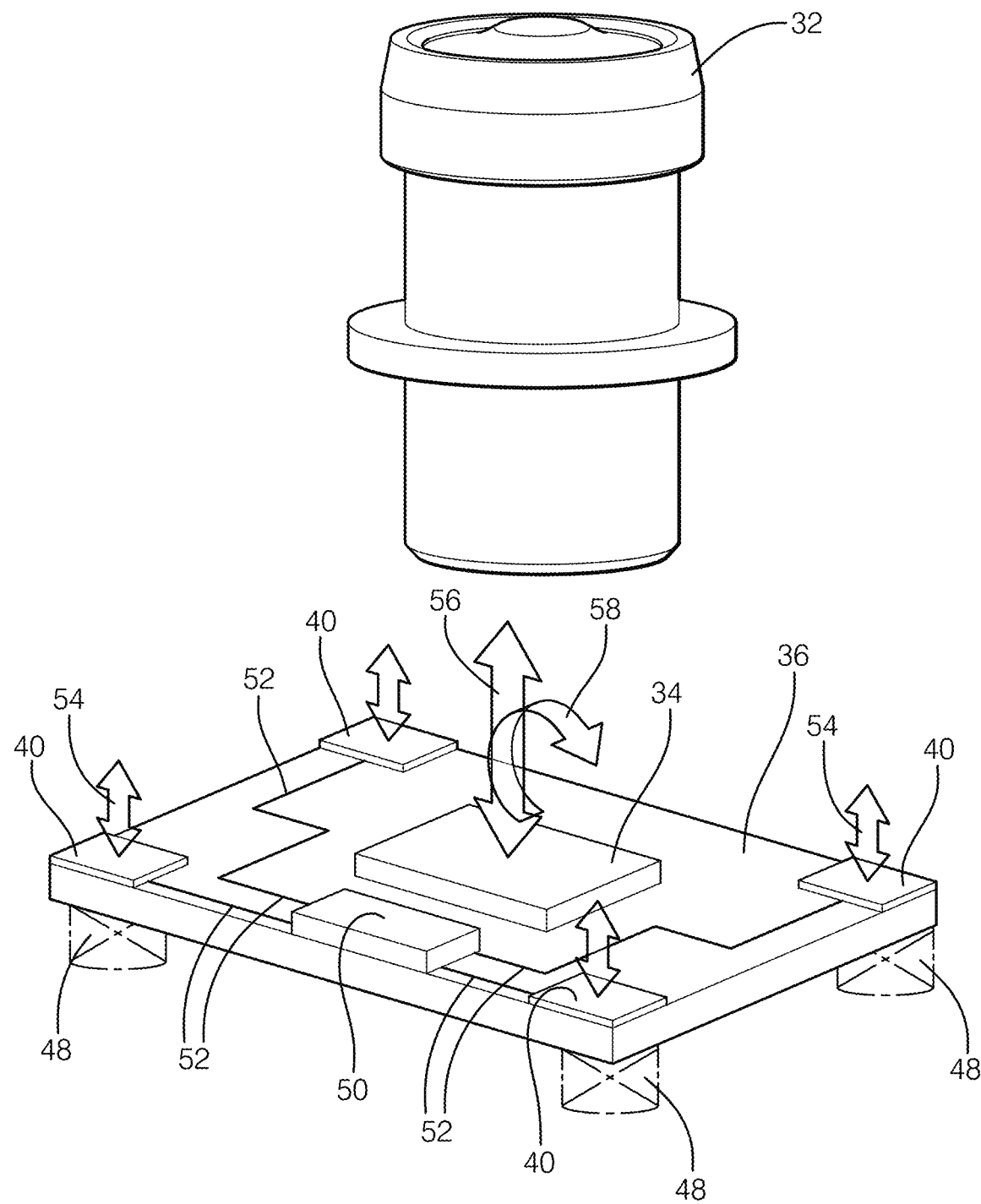
FIG. 4 schematically illustrates selected features of an example camera device.

As shown in FIGS. 2-4, the cameras 20 each include a housing 30 that supports a lens 32. A sensor 34 that is configured to capture images or gather image information is supported on a substrate 36. In the illustrated example embodiment, the substrate 36 is a generally planar printed circuit board. The sensor 34 is secured in a fixed position on the substrate 36, which is accomplished by soldering the sensor 34 in place in some embodiments.

An electroactive polymer 40 responds to electrical energy by changing shape or volume. The electroactive polymer 40 selectively causes relative movement between the sensor 34 and the lens 32 as it responds to changes in electrical energy provided to it. Such relative movement is useful for focusing or calibrating the camera 20. One feature of the illustrated example embodiment is that the electroactive polymer facilitates camera calibration during a manufacturing process and subsequently as may be needed during the service life of the camera 20. This feature is different from many camera devices in which the lens and sensor are set in manner that does not allow subsequent adjustment once the device is made.

In the illustrated example embodiment, the electroactive polymer 40 includes a plurality of portions or pads situated on the substrate 36. The portions of the electroactive polymer 40 are situated between the substrate 36 and a reaction surface 42 on the housing 30. The substrate 36 is supported in the housing by a substrate support 44. A plurality of fasteners 46, such as screws, hold the substrate support 44 in a desired location within the housing 30. Resilient members 48 are associated with the fasteners 46 and the substrate support 44 to allow for some movement of the substrate 36 within the housing. The resilient members 48 comprise springs in some embodiments and compressive pads in other embodiments. The resilient members 48 bias the substrate 36 and the portions of electroactive polymer 40 toward the reaction surface 42.

As shown in FIG. 4, the camera 20 includes a controller 50 that selectively provides electrical energy to the portions of electroactive polymer 40. In this example, circuit traces 52 on the substrate 36 conduct the desired amount of electrical energy to the portions of the electroactive polymer 40.

The controller 50 includes a processor or another computing device and memory. The controller 50 selectively provides electrical energy to the portions of electroactive polymer 40, respectively, to achieve a desired orientation between the lens 32 and the sensor 34. By changing the amount of electrical energy provided to each portion of electroactive polymer, the controller 50 is able to cause relative movement between the sensor 34 and the lens in three dimensions. For example, individually causing the portions of electroactive polymer 40 to expand or contract as schematically shown by the arrows 54 changes the position of the corresponding portion of the substrate 36 relative to the reaction surface 42 of the housing 30. The sensor 34 moves with the substrate 36 and therefore the distance between the lens 32 and the sensor 34 is adjustable as schematically shown by the arrows 56 in FIG. 4. Additionally, the controller 50 can control the electrical energy provided to the pads or portions of electroactive polymer 40 to selectively adjust a tilt angle of the sensor 34 as schematically shown by the adjustment arrow 58.

Figure 5:
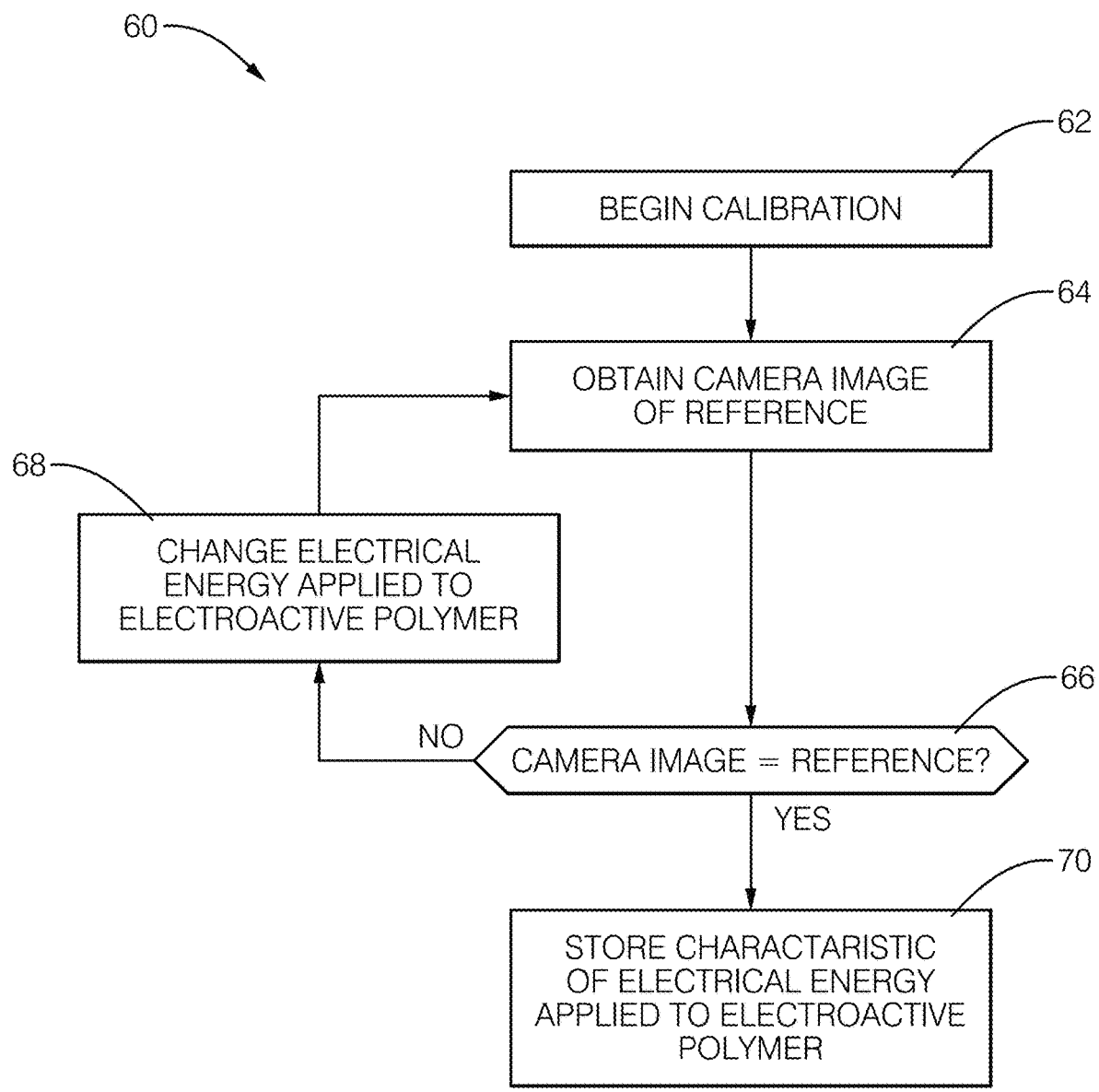
FIG. 5 is a flowchart diagram summarizing a method of calibrating a camera device.

Causing relative movement between the lens 32 and the sensor 34 facilitates calibrating the camera 20. An example calibration technique is summarized in the flow chart 60 of FIG. 5. Calibration begins at 62. At 64, the sensor 34 obtains an image of a reference, such as a known pattern or series of visible images. The controller 50 determines whether the image obtained by the sensor 34 corresponds to the reference at 66. If there is insufficient correspondence between the captured image information and the reference, the controller changes the electrical energy provided to at least one of the portions of electroactive polymer 40 at 68. The sensor obtains another image at 64 and the controller compares the most recently obtained image with the reference at 66. This process continues until there is sufficient correspondence between the captured image and the reference to indicate that the camera is properly calibrated. Once calibrated, at 70, the controller 50 stores at least one characteristic of the electrical energy provided to the respective portions of electroactive polymer 40. Example stored characteristics include voltage and current. The stored characteristics are subsequently used by the controller 50 to place or keep the sensor 34 and the lens 32 properly aligned to maintain calibration of the camera 20.

One feature of the illustrated embodiment is that it is possible to perform such calibration during a manufacturing process and subsequently at various times during the service life of the camera 20. For example, when the camera 20 is supported on the vehicle 22 it is possible for temperature conditions or impact to adversely affect the components of the camera 20 causing the camera 20 to lose calibration or to operate in a less-than-ideal manner. When a suitable reference is available, such as at a vehicle service center, the controller 50 can execute the calibration process summarized above to recalibrate the camera 20. Previous camera configurations without the electroactive polymer 40 could not be recalibrated because the lens 32 and sensor 34 are fixed in a manner that does not allow subsequent adjustment.

There are known electroactive polymer materials and those skilled in the art who have the benefit of this description will be able to select an appropriate material for their particular situation. An electroactive polymer is considered advantageous over a piezoelectric material, for example, because electroactive polymers have better strain percentage properties allowing for more adjustment or relative movement between the lens 32 and the sensor 34.

Although the sensor 34 and substrate 36 are moveable relative to the housing 30 while the lens remains stationary relative to the housing 30 in the illustrated example embodiment, other embodiments include a moveable lens 32.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A system, the system comprising a controller for maintaining calibration of a camera device for a vehicle, the controller having at least one processor configured to:
    produce relative movement in a vertical dimension between a lens and a sensor of the camera device by applying electrical energy to multiple electroactive polymer pads located distal from one another in a horizontal plane within a polymer layer of the camera device;
    adjusting the electrical energy that produces the relative movement to maintain a separation distance in the vertical dimension or a tilt angle between the sensor and the lens;
    determine that the camera device is in a calibrated state by:
        obtaining a first camera image of a reference when the sensor and the lens are in a first relative orientation associated with a first amount of electrical energy applied to the multiple electroactive polymer pads; and
        determining whether a correspondence between the first camera image and the reference indicates that the camera device is calibrated;
    determine at least one characteristic of the electrical energy applied to the multiple electroactive polymer pads when the camera device is in the calibrated state; and
    maintain the at least one characteristic of the electrical energy to maintain the calibrated state of the camera device.

2. The system of claim 1, wherein the at least one processor is further configured to:
    store, within a memory of the system, the at least one characteristic of the electrical energy applied to the multiple electroactive polymer pads when the camera device is in the calibrated state.

3. The system of claim 1, wherein the at least one characteristic of the electrical energy applied to the multiple electroactive polymer pads when the camera device is in the calibrated state includes at least one of a voltage applied to one or more of the multiple electroactive polymer pads or a current applied to one or more of the multiple electroactive polymer pads.

4. The system of claim 1, wherein:
    the correspondence between the first camera image and the reference indicates that the camera device is not calibrated; and
    the at least one processor is further configured to:
        apply a different amount of electrical energy to at least one pad of the multiple electroactive polymer pads to cause the relative movement between the sensor and the lens to achieve a second relative orientation between the sensor and the lens with respect to the separation distance or the tilt angle;
        obtain a second camera image of a reference when the sensor and the lens are in the second relative orientation; and
        determine whether a correspondence between the second camera image and the reference indicates that the camera device is calibrated.

5. The system of claim 1, wherein adjusting the electrical energy that produces the relative movement to maintain the separation distance or the tilt angle between the sensor and the lens in the calibrated state comprises selectively adjusting a position of at least one of the sensor or lens relative to the other of the sensor or the lens to recalibrate the camera device.

6. The system of claim 1, wherein:
    the multiple electroactive polymer pads are situated against a substrate and the sensor is disposed on the substrate; and
    the substrate includes at least one conductive trace for providing electrical energy to the multiple electroactive polymer pads using the controller.

7. The system of claim 6, wherein the camera device comprises a housing supporting the lens and the substrate, and wherein:
    a space occupied by the multiple electroactive polymer pads changes responsive to electrical energy applied using the controller;

the multiple electroactive polymer pads react against a reaction surface as the space occupied by the multiple electroactive polymer pads changes; and a position of the substrate relative to the housing changes as the multiple electroactive polymer pads react against the reaction surface.

8. The system of claim 1, wherein the relative movement includes both a change in the separation distance between the sensor and the lens and a change in the tilt angle between the sensor and the lens.

9. The system of claim 1, wherein:

applying electrical energy to the multiple electroactive polymer pads comprises applying an amount of electrical energy to each respective pad of the multiple electroactive polymer pads; and different amounts of electrical energy respectively applied to the respective pads of the multiple electroactive polymer pads causes different relative movements between the sensor and the lens.

10. The system of claim 1, wherein applying electrical energy to the multiple electroactive polymer pads further comprises providing electrical energy having a first characteristic to a first one of the multiple electroactive polymer pads and providing electrical energy having a second, different characteristic to a second one of the multiple electroactive polymer pads.

11. The system of claim 1, wherein the camera device is supported on the vehicle.

12. A method of calibrating a camera device, the method comprising:

providing electrical energy to an electroactive polymer comprising a plurality of electroactive polymer pads disposed on a first side of a substrate at locations distal from one another in a horizontal plane to cause relative movement in a vertical dimension between a sensor, disposed on the first side of the substrate, and a lens of the camera device to achieve a first relative orientation between the sensor and the lens, each location of the plurality of electroactive polymer pads including a single electroactive polymer pad that couples the first side of the substrate to a reaction surface of a housing supporting the lens and the substrate, each single electroactive polymer pad configured to expand or contract in a direction normal to the reaction surface of the housing to adjust a separation distance in the vertical dimension or a tilt angle of the sensor relative to the lens;

determining that the camera device is in a calibrated state by:

obtaining a first camera image of a reference when the sensor and the lens are in the first relative orientation associated with a first amount of electrical energy applied to the plurality of electroactive polymer pads; and determining whether a correspondence between the first camera image and the reference indicates that the camera device is calibrate;

determining at least one characteristic of the electrical energy applied to the plurality of electroactive polymer pads when the camera device is in the calibrated state; and maintaining the at least one characteristic of the electrical energy to maintain the calibrated state of the camera device.

13. The method of claim 12, further comprising:

storing, within a memory, the at least one characteristic of the electrical energy provided to the electroactive polymer when the camera device is in the calibrated state.

14. The method of claim 12, wherein:

the correspondence between the first camera image and the reference indicates that the camera device is not calibrated; and the method further comprises:

providing a different amount of electrical energy to at least one of the plurality of electroactive polymer pads to cause the relative movement between the sensor and the lens to achieve a second, different relative orientation between the sensor and the lens in the separation distance or the tilt angle;

obtaining a second camera image of a reference when the sensor and the lens are in the second relative orientation; and determining whether a correspondence between the second camera image and the reference indicates that the camera device is calibrated.

15. The method of claim 12, wherein:

providing the electrical energy comprises providing electrical energy having a first characteristic to a first one of the plurality of electroactive polymer pads and providing electrical energy having a second, different characteristic to a second one of the plurality of electroactive polymer pads.

16. The method of claim 12, wherein the relative movement between the sensor and the lens changes both the separation distance between the sensor and the lens and the tilt angle of the sensor relative to the lens.

17. The method of claim 12, wherein the camera device is supported on a vehicle and the method comprises performing the providing, obtaining, and determining a plurality of times during a service life of the camera device.

18. The method of claim 12, wherein the at least one characteristic of the electrical energy applied to the plurality of electroactive polymer pads when the camera device is in the calibrated state includes at least one of a voltage applied to one or more of the plurality of electroactive polymer pads or a current applied to one or more of the plurality of electroactive polymer pads.

19. The method of claim 12, wherein:

providing electrical energy to the plurality of electroactive polymer pads comprises providing an amount of electrical energy to each respective pad of the plurality of electroactive polymer pads; and different amounts of electrical energy respectively provided to the respective pads of the plurality of electroactive polymer pads causes different relative movements between the sensor and the lens.

20. The method of claim 12, wherein the substrate includes at least one conductive trace for providing electrical energy to the plurality of electroactive polymer pads using a controller.

* * * * *